United States Patent

Beaulieu et al.

[19]

[11] Patent Number: 6,142,063
[45] Date of Patent: *Nov. 7, 2000

[54] AUTOMATED BEVERAGE BREWING SYSTEM

[75] Inventors: Roderick H. Beaulieu, Cumberland, R.I.; James W. Wuertele, North Billerica, Mass.; Richard P. Sweeney, Winchester, Mass.; John E. Sylvan, Milton, Mass.; Kenneth A. Focht, Needham, Mass.; Jennie Kwo, Cambridge, Mass.

[73] Assignee: Keurig, Inc., Wakefield, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/232,994

[22] Filed: Jan. 19, 1999

[51] Int. Cl.[7] .................................................. A47J 31/32
[52] U.S. Cl. .............................. 99/283; 99/295; 99/302 R
[58] Field of Search .................................. 99/295, 302 R, 99/305, 307, 283, 280; 426/433

[56] References Cited

U.S. PATENT DOCUMENTS

| | | | |
|---|---|---|---|
| 4,143,589 | 3/1979 | Weber | 99/283 X |
| 4,815,366 | 3/1989 | Hauslein | 99/305 X |
| 4,922,809 | 5/1990 | Fuhner | 99/305 X |

OTHER PUBLICATIONS

Stan McLean, VKI Technologies; Mechanical Desktop application: Zuma Brewer; World Wide Web, www.autodesk.com/prodsol/mech/spotlite/zuma3.htm. Jan. 12, 1998.

Primary Examiner—Reginald L. Alexander
Attorney, Agent, or Firm—Samuels, Gauthier & Stevens, LLP

[57] ABSTRACT

An automated beverage brewing system includes a liquid storage tank and a metering chamber. The metering chamber is at least partially submerged beneath a standing level of liquid in the storage tank. The chamber includes a sealable liquid inlet port communicating with the interior of the storage tank beneath the standing level of liquid. The chamber also includes a liquid outlet port and an aperture that receives compressed air, wherein the compressed air forces a predetermined amount of liquid from the liquid output port of the chamber for use in preparing a brewed beverage. A pump provides the compressed air and a controller monitors a pressure signal value indicative of the air pressure in the metering chamber. The controller commands the pump on to commence flow of the predetermined amount of liquid from the metering chamber. The controller then commands the pump off several seconds after detecting a drop in air pressure within the chamber, indicating that the predetermined amount of liquid has been delivered to the brewing chamber. The chamber is then vented to ambient pressure, which opens the sealable liquid inlet port and refills the chamber.

8 Claims, 7 Drawing Sheets

AUTOMATED BEVERAGE BREWING SYSTEM

CROSS REFERENCE TO RELATED APPLICATIONS

This application contains subject matter that relates to the following applications filed evendate herewith, identified as Ser. No. 09/232,993 entitled "Beverage Filter Cartridge Holder" and Ser. No. 09/233,272 entitled "Apparatus for Consecutively Dispensing an Equal Volume of Liquid", both hereby incorporated by reference.

BACKGROUND OF THE INVENTION

This invention relates generally to beverage dispensing and brewing systems, and in particular with an improved apparatus for providing a brewed beverage.

Many different coffee brewing systems have been designed. Most utilize a pump, such as a peristaltic pump, to transfer water from a reservoir through a conduit to a brewing chamber. The pump is turned on at the beginning of a brewing cycle and at the end of a specific time period the pump is turned off. Other brewing systems use an electrically controlled device to open a valve at the bottom of a reservoir. Through gravity the water travels through a conduit to a brewing chamber. Again at the end of a specific time period, the valve is closed. These prior brewing systems lack the capability of consistently dispensing equal volumes of liquid. The systems are dependent on the accuracy of the timers, the pressure of the liquid, etc.

An object of the present invention is to provide an automated beverage brewing system for consistently dispensing a predetermined volume of liquid from a storage tank.

SUMMARY OF THE INVENTION

Briefly, according to the present invention, a beverage brewing system uses compressed air to drive a predetermined amount of liquid from a metering chamber for use in preparing a brewed beverage.

In one embodiment, the beverage brewing system includes a liquid storage tank and a metering chamber. The metering chamber is at least partially submerged beneath a standing level of liquid in the storage tank. The chamber includes a sealable liquid inlet port communicating with the interior of the storage tank beneath the standing level of liquid. The chamber also includes a liquid outlet port and an aperture that receives compressed air, wherein the compressed air forces a predetermined amount of liquid from the liquid output port of the chamber for use in preparing a brewed beverage. A pump provides the compressed air and a controller monitors a sensed pressure signal value indicative of the air pressure in the metering chamber. The controller commands the pump on to commence flow of the predetermined amount of liquid from the metering chamber. The controller then commands the pump off several seconds after detecting a drop in air pressure within the chamber, indicating that the predetermined amount of liquid has been delivered to the brewing chamber. The chamber is then vented to ambient pressure, which opens the sealable liquid inlet port and allows liquid to flow from the storage tank into the chamber. The sealable liquid inlet port automatically closes to complete the resupply of the metering chamber. To vent the chamber to ambient the controller commands an electrically controllable vent valve to the open position.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
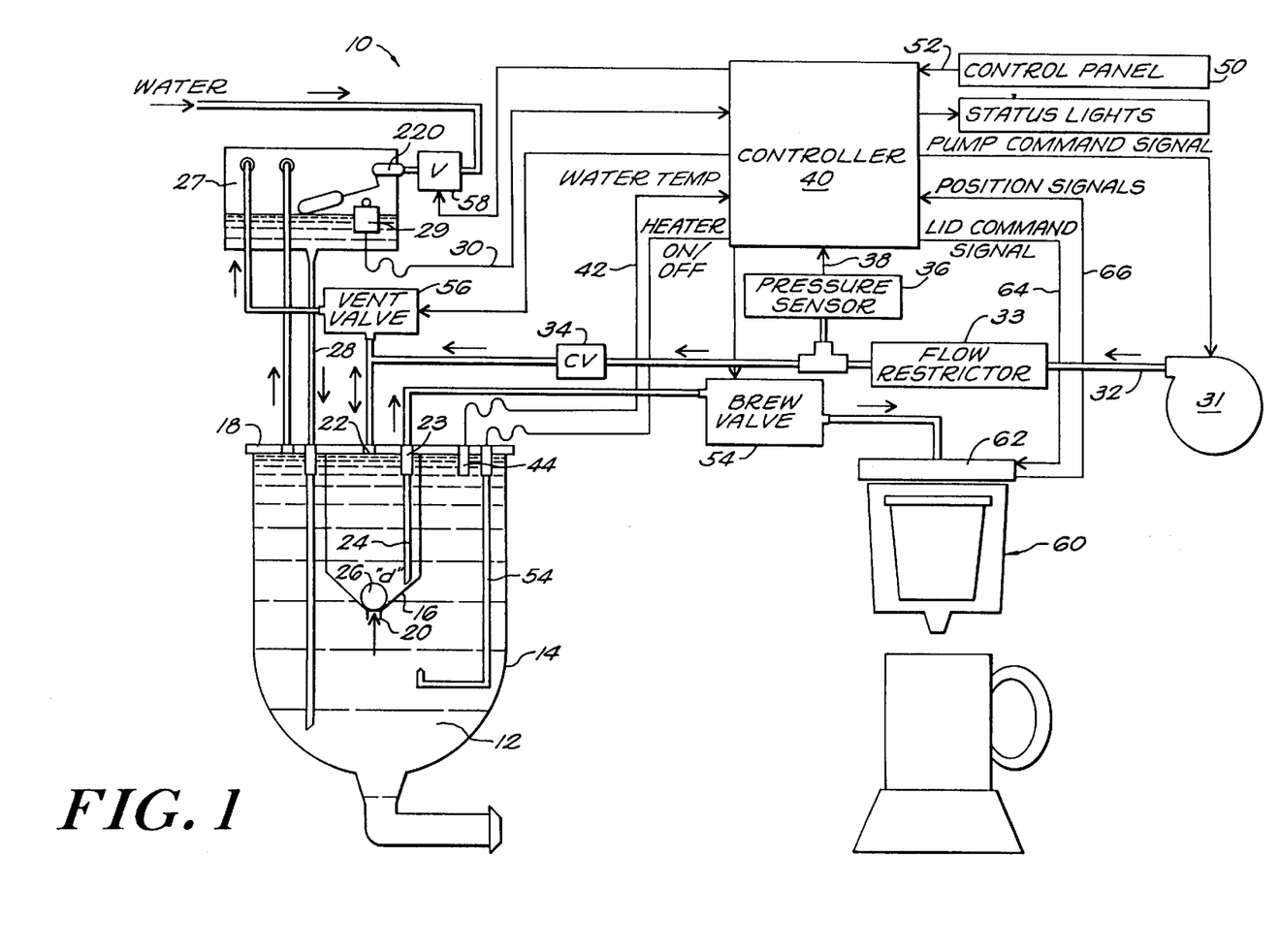
FIG. 1 is a diagrammatic illustration of an automated brewing system in accordance with the present invention.

The present invention is specially adapted for use in, although not limited in application to, a brewing system 10 illustrated in FIG. 1. Here, the dispensed liquid is water that is heated to a predetermined elevated temperature to brew beverages from extracts (e.g., coffee, tea, powders and concentrates) contained in disposable hermetically sealed cartridges. The brewing system consistently dispenses equal volumes of water 12 from a storage tank 14. A small metering chamber 16 is the primary dispensing component. The metering chamber 16 is at least partially submerged beneath the standing level of water 12 in the tank 14. A cover 18 overlies and hermetically seals both the tank and the metering chamber.

The metering chamber 16 has an inlet port 20 on the bottom thereof to accommodate water inflow from the tank 14, a pneumatic port 22, and a third port 23 that accommodates penetration into the metering chamber of a discharge conduit 24 to a depth "d". A one way valve accommodates an inflow of water from the tank 14 into the metering chamber 16 through the inlet port 20. In a preferred embodiment herein chosen for purposes of disclosure, the one way valve comprises a silicone ball 26 sized to gravitationally seat in and seal the inlet port 20. As shown, the ball 26 is seated in a closed position to prevent outflow of water from the metering chamber 16 via the inlet port 20. As will hereinafter be explained, the ball 26 is adapted to be dislodged from the inlet opening by an inflow of water from the storage tank 14.

The storage tank 14 receives water from a reservoir 27 via a fill conduit 28. An electrical float switch 29 is located in the reservoir 27 and provides a signal on a line 30 indicative of the water level in the reservoir.

An air pump 31 (e.g., a diaphragm pump) provides compressed air into a conduit 32, which routes the compressed air through flow restrictor 33 and a check valve 34 and into the pneumatic port 22. The flow restrictor 33 provides smoother compressed air. A pressure sensor 36 monitors the pressure within the conduit 32 and provides a sensed pressure signal value indicative thereof on a line 38 to a system controller 40. The controller 40 also receives a sensed temperature signal on a line 42 from a temperature sensor 44 (e.g., a thermistor) that monitors water temperature in the storage tank 14. In addition, the controller 40 receives input signals from a brewer control panel 50 such as a start brewing signal on a line 52, and the reservoir water level signal on the line 30.

The system also includes a brew valve 54, a vent valve 56 and a water shut-off valve 58. Each of these valves 54, 56 and 58 operate in open or closed states, in response to command signals from the controller 40.

The system 10 further comprises a beverage cartridge holder 60 that cooperates with an axially moveable lid 62, which is responsive to a lid position command signal on a line 64 from the controller 40. The controller 40 receives various position signals on a line 66, that include lid position signals that are used to verify that the lid has moved to its commanded position.

Figure 2:
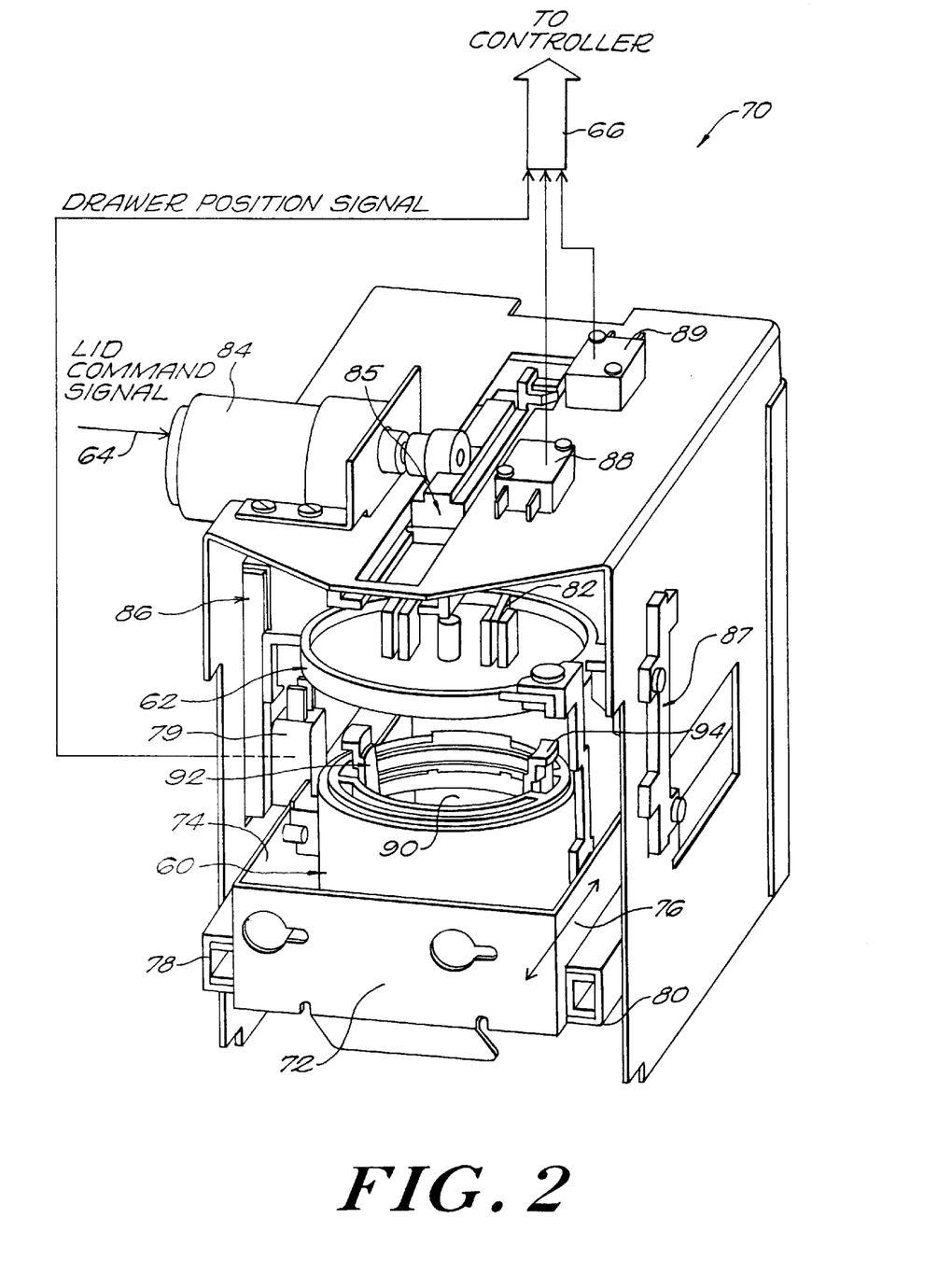
FIG. 2 is a pictorial illustration of a component of the brewing system that includes a cartridge holder and a lid.

FIG. 2 is a pictorial illustration of a brew head assembly 70 comprising the beverage cartridge holder 60 and the axially moveable lid 62. The system 70 includes a slidable drawer 72 comprising side panels 74, 76 that each include a mounting hole (not shown), which together pivotally mount the beverage cartridge holder 60 to the slidable drawer 72. The drawer 72 slides along track assembles 78, 80. A drawer microswitch 79 provides a drawer position signal on the line 66 indicative of whether or not the drawer is in the closed position.

The axially moveable lid 62 is manipulated by a linkage yoke 82 (partially shown), driven by an electric motor 84 through a pinion driven rack 85. The lid is axially guided along vertical side tracks 86, 87 between a ready position and a beverage brewing position. In the ready position the lid is axially positioned above and separated from the cartridge holder 60, assuming of course that the slidable drawer 72 is in the closed position. Microswitches 88, 89 detect if the lid is in the ready position or the beverage brewing position and provide the lid position signals on the line 66. The holder includes a chamber 90, and cartridge ejection arms 92, 94 that support and position a beverage cartridge (not shown) within the holder.

Figure 3A:
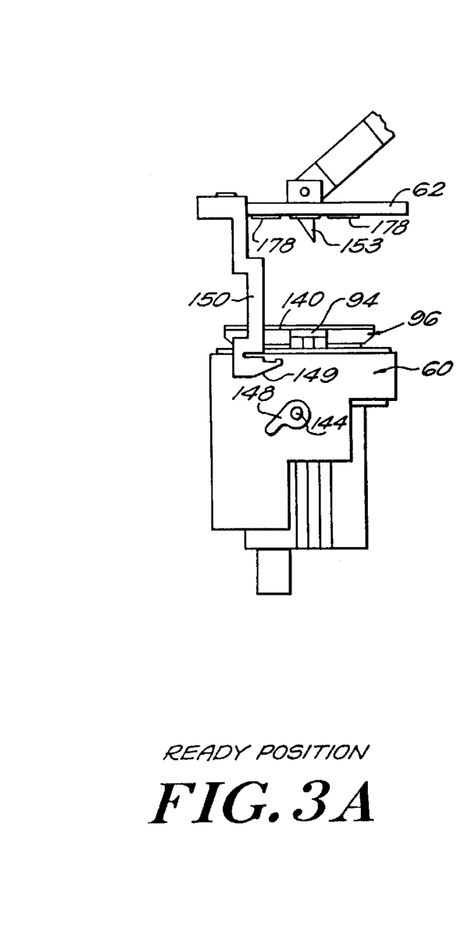
FIGS. 3A–3D are side views of the cartridge holder and the lid in various operational positions.

FIG. 3A is a side view of the cartridge holder 60 and the lid 62. As shown, a beverage cartridge 96 (preferably disposable) has been inserted into the cartridge holder 60. A preferred beverage cartridge is disclosed in U.S. Pat. No. 5,840,189, which is assigned to the assignee of the present invention and hereby incorporated by reference. A preferred cartridge holder is disclosed in co-pending application identified as Serial Number TBD, filed Jan. 19, 1999 and entitled "Beverage Filter Cartridge Holder", also assigned to the assignee of the present invention and incorporated by reference.

Referring again to FIGS. 1, in general the controller 40 monitors the pressure and temperature signals on the lines 38, 42 and the start brewing signal on the line 52 to control the pump 31, the tank heater 54 and various valves in the system. We shall now discuss the system control in more detail.

Figure 4A:
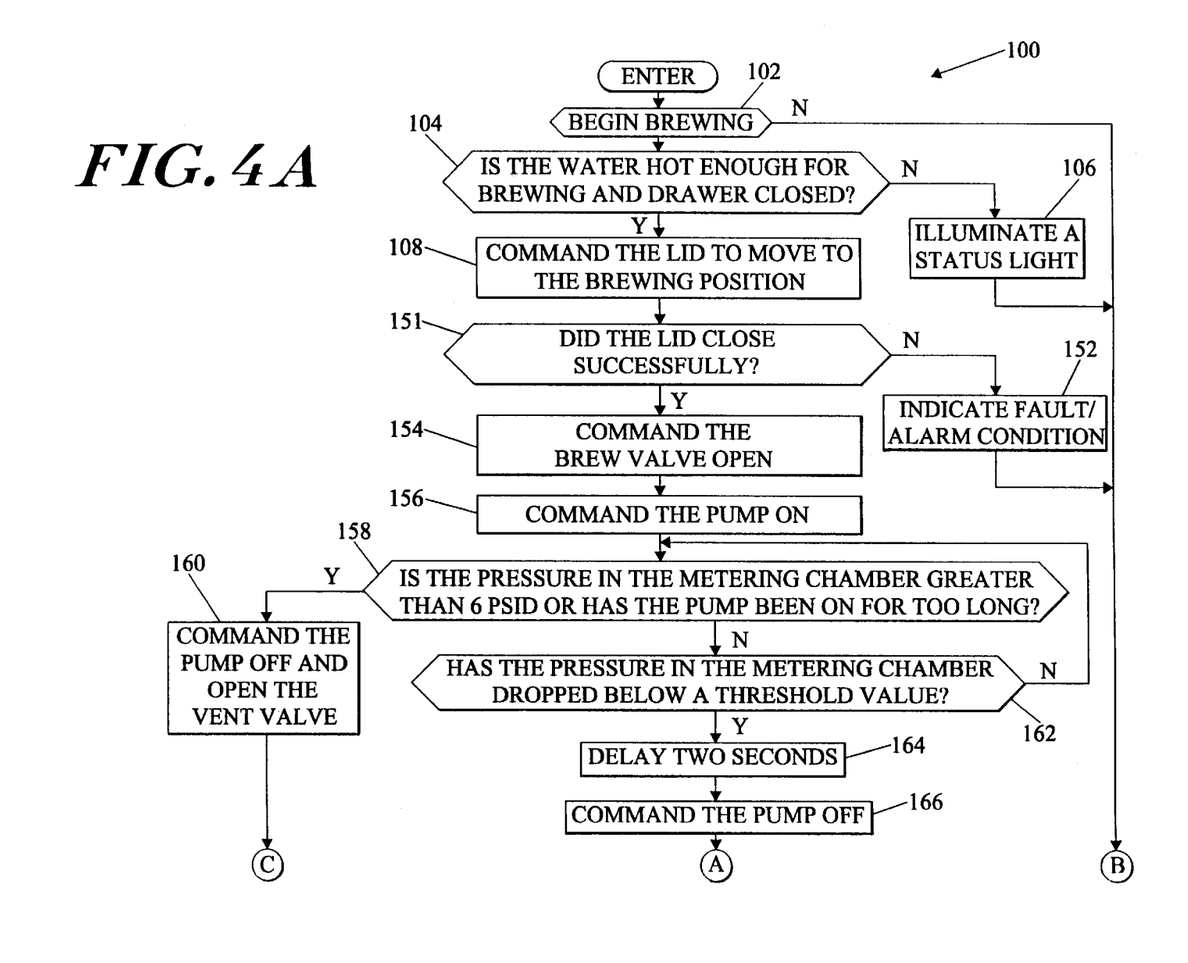
FIGS. 4A and 4B are flow charts that together illustrate steps performed by a controller during a brewing cycle.
Figure 4B:
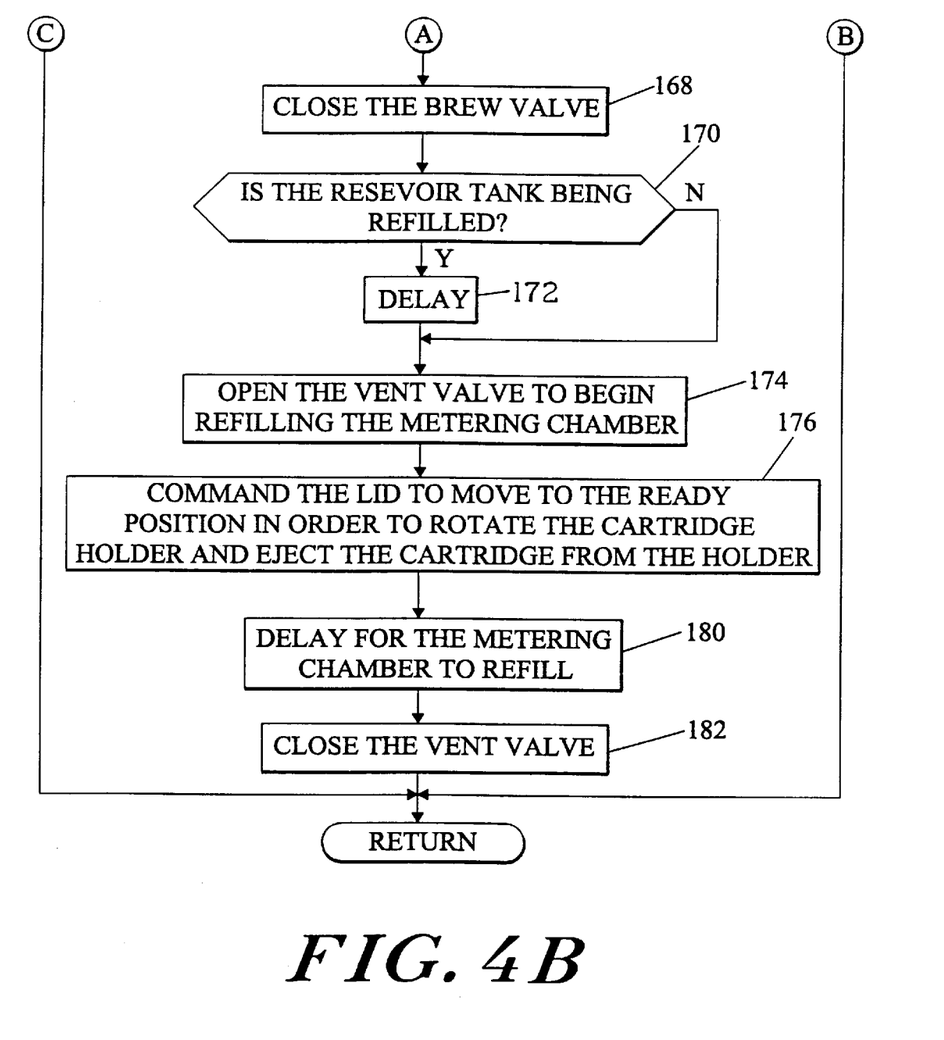

FIGS. 4A and 4B are flow charts that together illustrate a brew cycle routine 100 performed by the controller 40 (FIG. 1) during a brewing cycle. The controller 40 is preferably a microcontroller (MCU) such as a model PIC16C72-4 manufactured by Microchip Technology, Inc. of Phoenix, Ariz. This microcontroller includes on chip program memory, RAM, a RISC CPU and an analog-to-digital converter (ADC). In this embodiment, the steps illustrated in FIGS. 4A and 4B represent executable program instructions that are stored in the MCU program memory and periodically executed by the CPU.

The routine 100 includes a test 102 that determines if the brewing process should begin. This test checks the state of the start brewing signal on the line 52 (FIG. 1). If the signal indicates that a user has not depressed the start brewing button, then the remaining steps of the routine 100 are not executed. However, if the start brewing signal indicates that the user has depressed the start brewing button, test 104 is performed to determine if the water temperature is hot enough for brewing. The test 104 checks the sensed temperature signal value on the line 42 and if the temperature is too low, then step 106 is executed to illuminate a status light (e.g., a yellow light) and the routine 100 is ended. If the water temperature is hot enough for brewing step 108 commands the lid 62 (FIG. 2) to move to the beverage brewing position. Specifically, the controller sends a lid command signal on the line 64 (FIG. 1) to the motor 84 (FIG. 2), which axially drives the lid 62 along the vertical side tracks 86, 87 (FIG. 1) from the ready position to the beverage brewing position. We shall now briefly discuss the holder 60 and the lid 62.

Figure 5A:
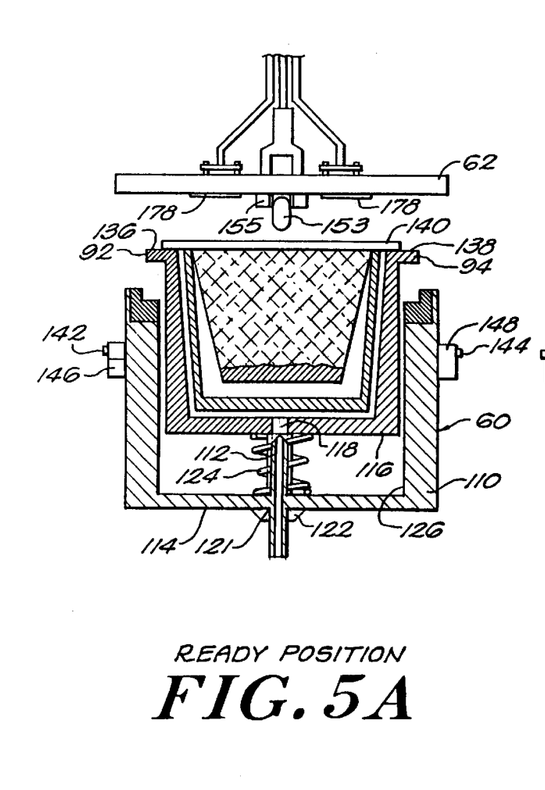
FIGS. 5A–5C are simplified cross sectional front views of the cartridge holder and the lid in various operational positions.

FIG. 3A illustrates the cartridge holder 60 populated with the cartridge 96, and the lid 62 in the ready position. FIG. 5A is a simplified cross sectional front view with the beverage cartridge 96 inserted into the holder 60, and the lid 40 in the ready position. The holder includes a housing 110 having an upwardly extending hollow piercing member 112 secured to a base surface 114. A slidable cartridge platform 116 having a bore 118 formed therein is coaxial with the upwardly extending piercing member 112, which allows the member 112 to extend through the slidable cartridge platform 116. The hollow piercing member includes a circular lip that rests on the periphery of a base surface opening 121, and an outwardly extending conduit 122 that passes through a base surface opening 121 and extends below the base surface 114.

A resilient member 124 (e.g., a spiral spring) is operatively located between the base surface 114 and the slidable cartridge platform 116. A sidewall 126 extends axially from the base surface 114 to define the chamber 90 (FIG. 2) that is sized to receive the cartridge 96. The sidewall 126 includes first and second guide channels (not shown) that engage cartridge ejection arms 92, 94, respectively, allowing the slidable cartridge platform 116 to axially move within the chamber. The cartridge ejection arms 92, 94 are connected to the slidable cartridge platform 116, and have axial end surfaces 136, 138 that contact and support a radially outwardly protruding lip 140 of the cartridge 96.

A pair of radially outwardly extending trunnions 142, 144 cooperate with holder mounting holes (not shown) in the side panels 74, 76 (FIG. 2) to pivotally support the holder. Pawls 146, 148 are used to position the holder 60 about the axis extending through the trunnions 142, 144.

Figure 3B:
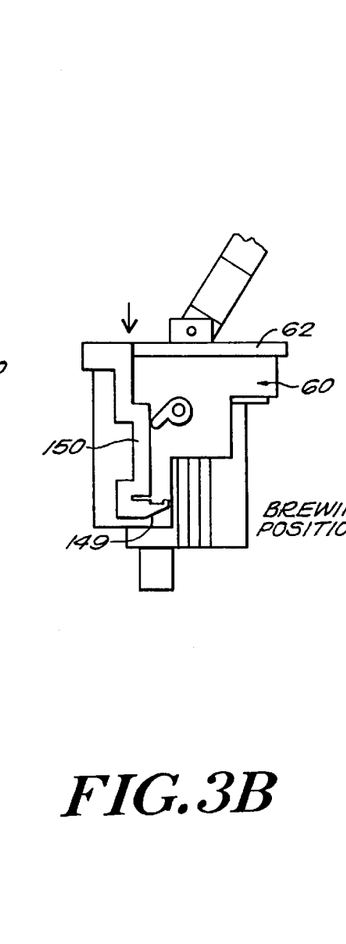
Figure 5B:
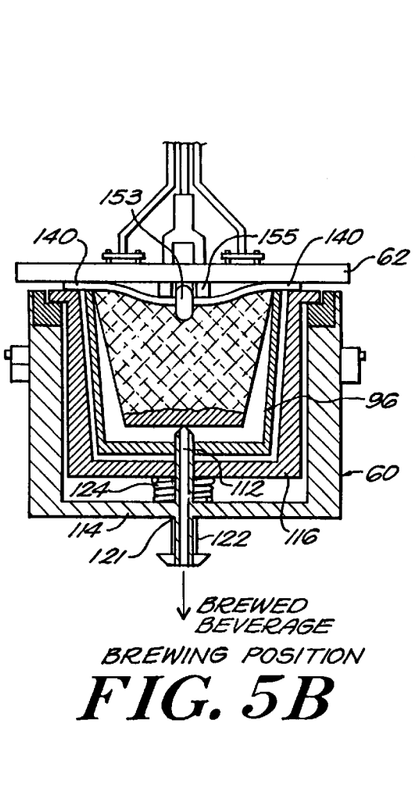
Figure 5C:
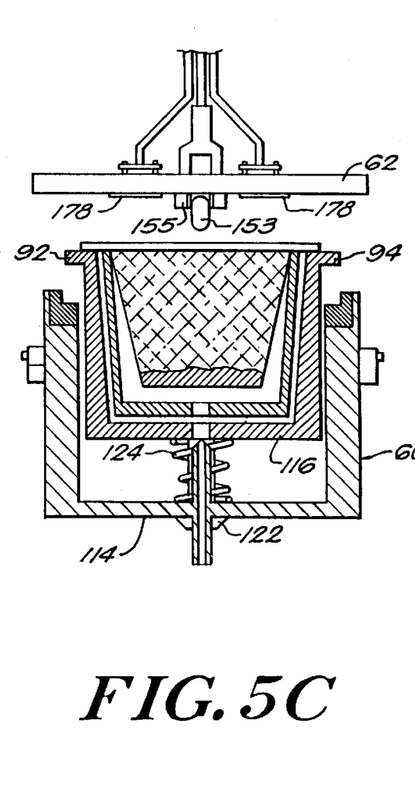

FIGS. 3B and 5B illustrate a side view and a simplified cross sectional view of the holder populated with the cartridge, and the lid in the beverage brewing position. As the lid 62 moves from the ready position (FIGS. 3A and 5A) axially downward to the beverage brewing position (FIGS. 3B and 5B), an inclined surface 149 of a downward projecting pivot arm 150 that is attached to the lid contacts the pawl 148. The pivot arm 150 and its inclined surface 149 are preferably a flexible plastic allowing the pivot arm to bend slightly away as the surface 149 slides downwardly against the pawl. As the lid continues axially downward the inclined surface passes below the pawl 148 and the pivot arm flexes back. The lid then applies an axial positioning force to the radially outwardly protruding lip 140 of the cartridge, moving the slidable cartridge platform 116 deeper into the chamber and compressing the resilient member 124. The force applied by the lid 62 causes a downwardly projecting apertured probe 153 to pierce the top of the cartridge 96 establishing a flow inlet that provides a liquid (e.g., hot water) to the interior of the cartridge. The force also causes the hollow piercing member 112 to extend through the bore 118 and pierce a bottom surface of the cartridge, to provide an exit flow path for a brewed beverage through the slidable cartridge platform 116 and the base surface 114. A foam gasket 155 surrounds the downwardly projecting apertured probe 153.

Referring again to FIG. 4A, following the step 108 the controller performs a test 151 to determine if the lid has successfully moved into the beverage brewing position. This test is performed by checking the status of the lid position signals on the line 66 (FIG. 1) from the microswitches 88, 89 (FIG. 1). If the lid has not successfully closed, step 152 is executed to annunciate the fault/alarm condition and the routine 100 is ended. However, if the lid has closed successfully, step 154 commands the brew valve 54 (FIG. 1) to open and step 156 commands the pump 31 (FIG. 1) on.

Referring now to FIG. 1, as the pump 31 drives compressed air into the metering chamber 16, the water in the metering chamber is driven into the discharge conduit 24 and passes through the brew valve 54 into the cartridge holder 60. The increased pressure within the metering chamber 16 firmly seats the silicone ball 26 over the inlet 20 to prevent flow from the storage tank 14 to the metering chamber 16. As shown in FIG. SB, the water from the metering chamber (not shown) enters the cartridge 96 through the downwardly projecting apertured probe 153, passes through beverage extract and a filter within the cartridge, and exits the cartridge 96 through the hollow piercing member 112.

Referring again to FIG. 4A, the controller performs a safety test 158 to monitor the sensed pressure signal value on the line 38 (FIG. 1), which is representative of the pressure in the metering chamber. If the pressure rises to more the 6 PSI above ambient pressure, then step 160 commands the pump off and the vent valve 56 (FIG. 1) to the open position in order to release the pressure in the metering chamber 16 (FIG. 1). The test 158 also checks if the pump has been on for more than a limit amount (e.g., one minute) and executes the step 160 if it has. If an over pressure or a time-out situation does not exist, test 162 is performed to determine if the air pressure in the metering chamber has dropped below a threshold value indicating that a predetermined amount of liquid (e.g., eight fluid ounces) has exited the metering chamber. This test 162 monitors the sensed pressure value on the line 38 (FIG. 1). The threshold value is preferably a fraction of the maximum sensed pressure during the brewing cycle. For example, the threshold may be 75% of the maximum sensed pressure during the brewing cycle. Alternatively, the threshold may be a constant value.

Once the sensed pressure drops below the threshold value, step 164 is performed to delay several seconds in order to blow residual liquid from the liquid flow path located between the metering chamber and the cartridge holder outlet. Significantly, blowing out the flow path ensures that only hot water is used to brew, which is especially important if there is a substantial period between use. In addition, blowing out the flow path removes liquid from the used cartridge for cleaner disposal. One of ordinary skill will recognize that during the delays the controller performs other tasks such as input signal processing, output signal processing, storage tank temperature control, reservoir water level control, and background and foreground built-in-tests. The delays may be implemented by hardware or software counters.

Steps 166, 168 are then executed to command the pump off and close the brew valve 54 (FIG. 1). At this time the metering chamber is still pressurized and includes only a small amount of water that is located below the discharge conduit 24 (FIG. 1).

Test 170 is performed to determine if the shut-off valve 58 (FIG. 1) is opened, indicating that the reservoir 27 (FIG. 1) is still being refilled from previous brewing cycles. If it is, then refilling of the metering chamber is delayed by step 172. Refilling the metering chamber begins when step 174 commands the vent valve 56 (FIG. 1) to open. This reduces the air pressure in the metering chamber to ambient pressure, causing the silicone ball 26 (FIG. 1) to be unseated and water to enter the chamber through the inlet 20 (FIG. 1). The water fills the metering chamber and the silicone ball gravitationally reseats in the liquid inlet. The reservoir 27 (FIG. 1) refills the storage tank 14 via the fill conduit 28.

Figure 3C:
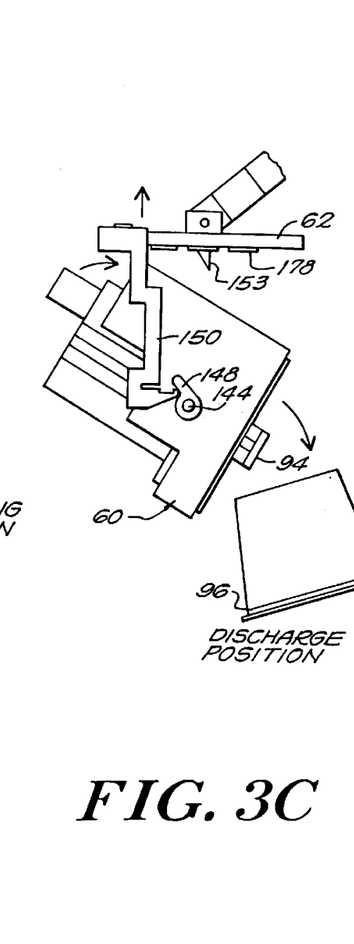
Figure 3D:
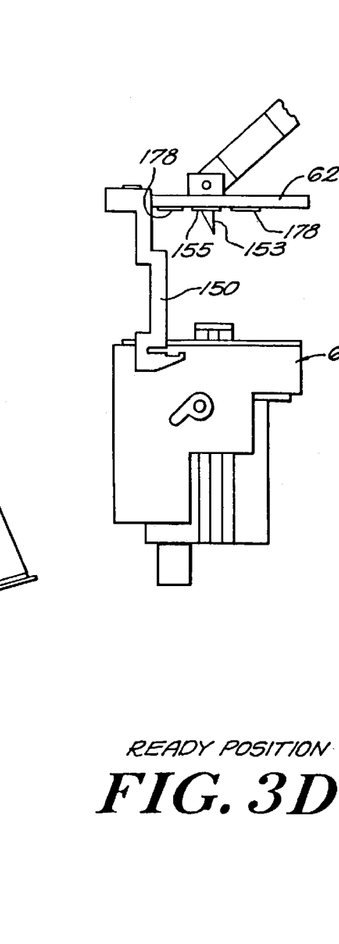

Step 176 is then performed to move the lid from the beverage brewing position to the ready position. FIG. SC illustrates a transitional lid position as the lid moves from the brewing position to the ready position, illustrating the cartridge withdrawn from the hollow piercing member 112. Significantly, as the lid moves upward the resilient member 124 expands causing the slidable cartridge platform 116 to move axially upward withdrawing the cartridge 96 from the hollow piercing member 112. Referring to FIG. 3C, the downward projecting pivot arm 150 engages the underside of the pawl 148 as the lid moves to the ready position. Specifically, as the lid axially moves from the brewing position to the ready position the pivot arm contacts the underside of the pawl 148 causing the holder to rapidly rotate about the trunnions. The other pawl 146 cooperates with stops (not shown) located on the sidewall 74 (FIG. 2) to limit the pivotal movement of the holder between the upright position and discharge positions (e.g., about 135 degrees of rotation). As the holder rapidly rotates, the pawl 146 strikes one of the stops abruptly stopping the rotation of the holder and ejecting the cartridge. Advantageously, this automatically removes the cartridge from the holder upon the completion of the brewing cycle. As the lid continues moving upward to the ready position, the pivot arm disengages from the pawl and allows the empty cartridge holder to pivot about the trunnions back to the upright position, as shown in FIG. 3D. To ensure the lid 62 separates from the top of the cartridge 96, a plurality of projections 178 are located on the underside of the lid 62. For example, the projections 178 may radially extend from the center of the underside of the lid. The foam gasket 155 also assists in separating the lid 62 from the top of the cartridge 96.

Referring yet again to FIG. 4B, step 180 is performed to delay several seconds to ensure there is enough time between opening of the venting valve in the step 174 and closing of the valve in step 182 for the metering chamber to refill.

To brew another beverage, the drawer 22 (FIG. 1) is opened and a new cartridge is inserted into the holder.

Figure 6:
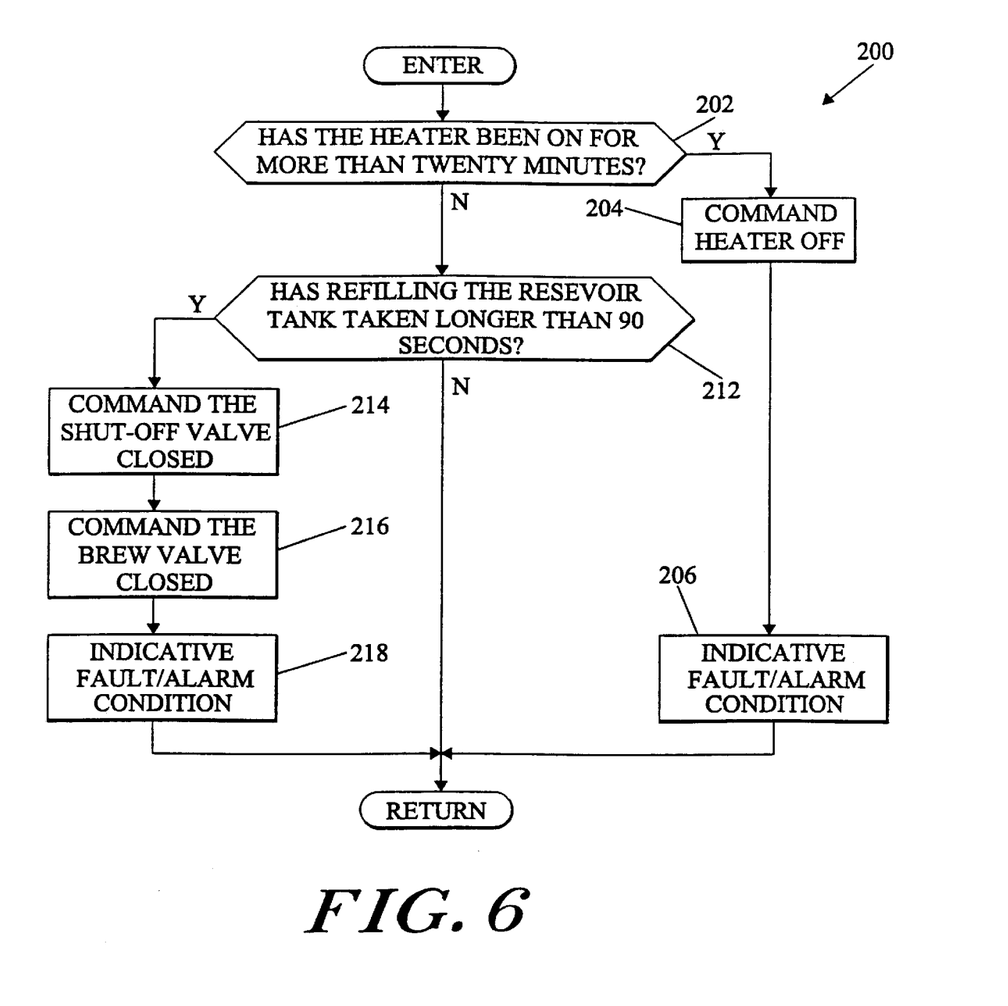
FIG. 6 is a flow chart of a built-in-test routine periodically performed by the controller.

FIG. 6 is a flow chart of a built-in-test routine 200 periodically performed by the controller. The routine 200 includes a test 202 to determine if the heater 54 (FIG 1) has been on for an excessive amount of time (e.g., twenty minutes). If it has, step 204 is performed to command the heater off, followed by step 206 to annunciate the fault/alarm condition. Otherwise, test 208 is performed to determined if the metering chamber 16 (FIG. 1) is over pressurized. If it is, then step 210 is performed to turn the pump off and open the vent valve followed by the step 206 to annunciate the fault/alarm condition. However, if over pressurization does not exist, test 212 checks if the shut-off valve 58 (FIG. 1) has been opened for too long (e.g., ninety seconds). If it has, steps 214, 216 and 218 are performed to close the shut-off and brew valves and indicate a fault/alarm condition. Notably, referring again to FIG. 1, the system 10 preferably includes a float type shut-off valve 220 that closes if the water level in the reservoir is too high. This valve is redundant with the electrically controllable shut-off valve 58 (FIG. 1), and this redundancy virtually eliminates single point failures from causing overfilling.

Referring finally to FIG. 1, the controller 40 also performs reservoir water level control by monitoring the reservoir water level signal on the line 30. The controller opens the shut-off valve 58 when the reservoir water level falls below a lower limit and closes the valve when the level is above an upper limit.

While the present invention has been described in the context of a preferred embodiment that senses air pressure to determine when the predetermined amount of liquid has been delivered from the metering chamber, the present invention is not so limited. For example, a level sensor (e.g., a float switch) may be located in the metering chamber to determine when the liquid in the chamber is below a certain level. In addition, the pump may be simply commanded on for a set period of time sufficient to ensure that the predetermined amount of liquid has been delivered from the metering chamber. Notably, it suffices that in all these embodiments of the present invention compressed air is used to drive the predetermined amount of liquid from the metering chamber.

Although the present invention has been discussed in the context of an automated brewing system that includes a microcontroller, one of ordinary skill will recognize that there a number of different techniques for controlling the delivery of the compressed air to the metering chamber. For example, a state machine may be used rather than a CPU. In addition, the controller may be an analog system rather than a digital controller. Furthermore, a pneumatic controller rather than an electronic controller may be used to control delivery and venting of the compressed air. While obvious, it should also be noted the present invention is certainly not limited to the delay values, threshold values or brewing sizes discussed herein. In addition, it is contemplated that rather than an electrically controllable valve, the vent valve may be mechanically linked to the lid so the valve opens as the lid moves from the beverage brewing position to the ready position. The present invention may also operate in a "vending" environment. That is, as a vending machining, the system would not start brewing until money has been deposited or an account debited. For example, test 104 (FIG. 4A) may check to ensure the required fee has been paid before brewing is allowed to start.

Although the present invention has been shown and described with respect to several preferred embodiments thereof, various changes, omissions and additions to the form and detail thereof, may be made therein, without departing from the spirit and scope of the invention.

What is claimed is:

1. A brewing system for brewing a beverage from an extract contained in a sealed disposable cartridge, said system comprising:
   a housing defining a brewing chamber for receiving said cartridge;
   means associated with said housing means for piercing said cartridge to provide a first inlet and a first outlet communicating with the interior of said cartridge;
   a storage tank comprising a supply of liquid;
   a sealed metering chamber contained in said storage tank at least partially submerged in said liquid, said chamber being in communication with said storage tank via a second inlet and being in communication with said cartridge via a second outlet;
   valve means associated with said second inlet for admitting liquid into said chamber from said storage tank and for preventing reverse liquid flow from said chamber into said tank;
   means for delivering compressed air to said metering chamber to transfer a predetermined volume of liquid from said metering chamber via said second outlet for delivery to and through said cartridge via said first inlet and said first outlet, and for sensing the pressure of said compressed air and providing a sensed pressure signal value indicative thereof; and
   a controller that (i) commands said means for delivering to provide compressed air to said metering chamber, (ii) monitors said sensed pressure signal value and (iii) commands said means for delivering to terminate delivery of compressed air to said metering chamber after detecting that said sensed pressure signal value has dropped below a threshold value indicating said predetermined volume of liquid has been delivered through said second outlet.

2. The brewing system of claim 1, wherein said means for delivering comprises:
   a pump for generating said compressed air;
   a flow line that receives and provides said compressed air to said metering chamber; and
   a pressure sensor disposed to sense the pressure of said compressed air within said flow line and provide said sensed pressure signal value.

3. The brewing system of claim 2 wherein said controller commands off said means for delivering to terminate delivery of said compressed air a predetermined time after detecting that said sensed pressure signal value has dropped below a threshold value.

4. The brewing system of claim 3, further comprising a vent valve that includes an inlet in communication with said compressed air within said metering chamber and is responsive to a vent valve control signal from said controller, wherein said controller commands said vent valve to open to vent said compressed air within said metering chamber to ambient pressure.

5. An automated beverage brewing system that receives a cartridge containing a beverage extract and establishes a liquid flow path through the cartridge to provide a brewed beverage that includes a predetermined volume of liquid, said system comprising:
   a holder that holds and pierces the cartridge to provide a cartridge inlet and a cartridge outlet that together establish a flow path through the beverage extract to provide the brewed beverage;
   a liquid storage tank;
   a sealed metering chamber at least partially submerged beneath a standing level of liquid in said storage tank, and having a chamber inlet port communicating with the interior of said tank beneath said level of liquid and a chamber outlet port connected to said holder;
   a pump that provides compressed air along a flow line to said metering chamber to force liquid from said metering chamber and through said chamber outlet port;
   a sensor that senses air pressure in said flow line and provides a sensed pressure signal indicative thereof; and a controller that commands said pump on, monitors said sensed pressure signal and turns said pump off after detecting that said sensed pressure signal value has dropped below a threshold value indicating the predetermined volume of liquid has been delivered through said chamber outlet port.

6. The brewing system of claim 5, wherein said controller also commands said pump off if said sensed pressure signal value exceeds an upper pressure threshold value.

7. The brewing system of claim 6, further comprising:

a temperature sensor that senses the temperature of the liquid in said storage tank and provides a sensed temperature signal value indicative thereof, wherein said controller monitors said sensed temperature signal value and will not command said pump on if said sensed temperature signal value is below a temperature threshold value.

8. The brewing system of claim 5, further comprising a vent valve responsive to a vent valve command signal from said controller for releasing said compressed air within said sealed metering chamber.

* * * * *